United States Patent
Bernstam

(10) Patent No.: US 6,322,868 B1
(45) Date of Patent: Nov. 27, 2001

(54) USE AND MANUFACTURING APPLICATIONS OF POLYMER / DYE-BASED THIN LAYER COATINGS FOR ENHANCEMENT OF THE QUALITY OF RECORDING ON AND READOUT FROM THE OPTICAL STORAGE MEDIA

(75) Inventor: Victor A. Bernstam, 3428 Woodland Rd., Ann Arbor, MI (US) 48104

(73) Assignee: Victor A. Bernstam, Ann Arbor, MI (US)

( * ) Notice: Subject to any disclaimer, the term of this patent is extended or adjusted under 35 U.S.C. 154(b) by 0 days.

(21) Appl. No.: 09/063,312

(22) Filed: Apr. 20, 1998

(51) Int. Cl.$^7$ ........................................................ B32B 3/02
(52) U.S. Cl. ...................... 428/64.1; 428/64.2; 428/64.4; 428/64.8; 428/447; 428/913; 430/270.14; 430/495.1; 430/945; 369/283; 369/288
(58) Field of Search .................................. 428/64.1, 64.2, 428/64.4, 64.8, 447, 913; 430/270.14, 495.1, 945; 369/283, 288

(56) References Cited

U.S. PATENT DOCUMENTS

| | | | | |
|---|---|---|---|---|
| 5,054,888 | * | 10/1991 | Jacobs et al. | 359/76 |
| 5,351,151 | * | 9/1994 | Levy | 359/240 |
| 5,824,768 | * | 10/1998 | Burns et al. | 528/422 |

* cited by examiner

*Primary Examiner*—Elizabeth Evans
(74) *Attorney, Agent, or Firm*—Victor A. Bernstam

(57) ABSTRACT

Composition and use of polymers in appropriate solvent(s) with or without addition of selected dye combinations are proposed for developing a thin-layer coating on the transparent layer of optical storage media such as audio and video CDs, laser discs (LD) and DVDs for improvement of the sound and/or video quality during either recording and/or playback of the encoded digital information.

The invention can also be incorporated in manufacture of recordable (CD-R) and re-writeable CD (CD-RW) media. In that case, the proposed composition is applied on the polycarbonate transparent surface of optical storage media at the final stages of recordable media manufacturing.

6 Claims, No Drawings

USE AND MANUFACTURING APPLICATIONS OF POLYMER / DYE-BASED THIN LAYER COATINGS FOR ENHANCEMENT OF THE QUALITY OF RECORDING ON AND READOUT FROM THE OPTICAL STORAGE MEDIA

This invention relates to the enhancement of performance of optical storage media by applying a thin layer coating containing liquid mixtures of polymers and dyes in organic solvents on the surface of transparent plastic separating it from the recording layer.

BACKGROUND OF THE INVENTION

Field of Invention: Fundamentals of the Compact Disc Optical Storage Technology—a Brief Summary Optical information storage media such as CDs rely on high accuracy writing and readout of the encoded information by the optical devices (optical pick-ups) in dedicated apparatuses such as CD-ROM drives, CD and DVD recorders and players, etc. Information in such storage media can be encoded by a variety of physical and chemical means which change the structure of the information layer. The most widely used format of digital encoding is physical alteration of the data (information) layer expressed in the form of precisely defined pits and lands, waves, bubbles, etc. The accuracy of the writing and readout of the encoded information depends upon fidelity of the laser optics device for recording and playback as well as upon optical characteristics of the transparent layer of plastic (usually polycarbonate) of the CD/DVD.

While sophisticated error correction algorithms, e.g., Cross Interleave Reed Solomon code—CIRC, are used to compensate successfully for the inevitable random and spike errors during optical storage media readout, significant variables exist in the ability of CD players and CD-ROM drives to accurately reproduce all of the encoded information. Variations in the quality and light transmitting characteristic of the transparent polycarbonate layer of the optical storage media also contribute to such inaccuracies.

The optical characteristics of the transparent polycarbonate layer are critical also during the recording process on recordable and re-writeable CD-R/CD-RW/DVD for the optimization of the geometry of the physical traces of the laser burning action on the recordable information layers in such recordable media.

In some cases, variations in the optical disc manufacturing process, the efficiency of error correction algorithums used as well as in optical and mechanical properties of the readout devices introduce noticeable errors in the readout. For reasons well understood by those versed in the art description of which is beyond the coverage of this submission, low amplitude signals as well as those of high frequency and short duration are particularly prone to reproduction distortions due to the less than optimal error correction of such encoded sounds during readout (J Halliday, 1996).

Likewise, during recording on optical discs in appropriate recorders, variation in or the presence of noise in the laser beam characteristics will result in distortion of timing and the pit geometry to a relatively greater extent affecting the smaller pits rather than longer pits (J Halliday, 1996). Consequently, the information content carried in the smaller pits (more abundant in encoded high frequency audio signals) will be disproportionately affected during playback (J Halliday, 1996) . On the other hand, strong signals of high amplitude and relatively longer duration are less prone to be distorted (see for example: Pohlmann, 1995).

In the case of audio optical storage media (eg CDs), such deficiencies are perceived as frequency distortions, audible imperfections of sound resulting in apparent loss of the encoded information. Various causes related to the laser light transmission process and reflection of the beams from the data layer of the optical storage media via the transparent (polycarbonate) layer of the optical storage media may account for this deficiency.

Among such causes can be, but not limited to, the unwanted light scattering, diffraction and reduced reflection from the data layer, reflection from an interfering object, media and surfaces not intended to produce these optical aberrations.

The Role of Jitter in Signal Deterioration

The principle cause of audible imperfections is jitter. Essentially there are three main causes of jitter:

First, imperfect geometry of the recorded pits themselves. "Anything which causes unwanted variations in the sizes of the pits will come out as jitter. One thing that can be significant is laser noise; that is, high-frequency variations in the power of the recording spot. Not surprisingly, if the power varies, the pits also vary in width and length, so when the CD is played the apparent pit lengths vary" (J Halliday, 1996).

The second "source of jitter is the influence of other pits nearby in the same track. The readout spot is broad enough that when the center of the spot reaches the beginning of a short pit, the end of the pit lies within the fringes of the spot. So the apparent position of the one pit end is slightly dependent on where the other end is. The same applies to short lands. This is called inter-symbol interference. The jitter which arises from this is not truly random, but is associated with the pattern of recorded pit and land lengths" (J Halliday, 1996).

"Inter-symbol interference is worse at low recording velocities, because the pits are shorter and closer together. And it is the cause of "deviation" of the pit lengths". . . . "If the shortest pits appear too short on playback, it is only because most of them are next to lands which are longer" (J Halliday, 1996).

The "third source of jitter is the crosstalk between pits in adjacent tracks, because the readout spot does not fall wholly on one track. It is a largely random contribution. It is worse at lower recorded velocities, because the highest frequency components of the readout signal in the wanted track, with which the crosstalk is competing, are weaker" (italics and emphasis are ours) (J Halliday, 1996).

In order to reduce the undesirable effects of jitter one can give "a gentle boost of the higher frequencies (so it relatively strengthens the signals from the shorter pits and lands), and to some extent it has the effect of correcting for the effects of the optical resolution limitations which cause inter-symbol interference and crosstalk. The deviation of the shorter pit lengths is likewise reduced" (italics and emphasis are ours) (J Halliday, 1996).

These timing aberrations result in unwanted digital noise and deterioration of information retrieval from CDs/LDs/CD-Rs/CD-Rs/CD-RWs/DVDs particularly demonstrable in transients.

The accuracy of readout depends among other things also upon on adequate reflection (and in part resulting cancellation) of the diode laser beam from the transition points of the pits and lands of submicron dimensions in the metallized data layer. The minimum degree of expected reflectance beam is 70%. Reflectance of the recordable and re-writeable optic media (CD-Rs, CD-RW) is even lower. It is obvious, therefore, that improvement of the readout would occur if the data layer would have high reflectance while the exterior polycarbonate surface of the optical storage media does not contribute to light scattering and reflectance.

BACKGROUND ART

Numerous reports and inventions are known related to coating processes in the optical storage media field. Our search of the patent literature as well as of published reports in scientific and technical fields related to optical storage media, laser beam treatment and/or coating processes revealed no evidence of either existing or claimed surface coating technology, or compositions similar to or distinct from those described in the present invention that are specifically intended to, designed for or claim to achieve enhancement of efficiency of recording on and readout of encoded information from optical storage media as a result of surface coating such as described in the present invention.

All of these describe technologies, uses and/or compositions either a) relate to application of complex polymer-dye containing coating layers to serve as substrates for encoding digital information in these layers the latter being an integral part of the physical structure of the optical storage media in the process of its manufacture (eg., U.S. Pat. No. 5,609,990 Ha, et. al., 1997; U.S. Pat. No. 5,389,422 Okazaki, et. al., 1995; U.S. Pat. No. 5,470,626 Fleming, et. al., 1995), or b) relate to surface coating processes intended to impart physical characteristics such non-glare, anti-reflection, anti-static, anti-scratch, etc. completely different in intent, composition, method of application and retention on surfaces from those of the present invention (eg., U.S. Pat. No. 4,578,266 Tietjen, et. al., 1986; U.S. Pat. No. 4,929, 703 Narula, et. al., 1990; U.S. Pat. No. 4,942,065 Factor, et. al., 1990; U.S. Pat. No. 5,162,453 Hall, et. al., 1992; U.S. Pat. No. 5,486,578 Carpenter, II, et. al., 1996; U.S. Pat. No. 5,492,769 Pryor, et. al., 1996; U.S. Pat. No. 5,500,300 Eckberg, 1996; U.S. Pat. No. 5,518,788 Invie, 1996)

None of such improvements, inventions or technology either pre-date, compete with, contain claims identical or similar to those of the present invention, or constitute any part of or the entirety of the present invention.

To the best of our knowledge, 1) prior to the present invention there have been no technological developments similar to or specifically intended to effect surface treatment of optical storage media for the purpose of modification and improvement of the laser beam characteristics during recording or readout of the encoded information;

2) furthermore, to the best of our knowledge, prior to the present invention there have been no technological developments specifically intended to use apodization screens to effect modification and improvement of the laser beam characteristics in relation to the optical storage media;

3) additionally, to the best of our knowledge, prior to the present invention there have been no technological developments specifically intended to use apodization screens to impart enhanced sonic characteristics of the audio compact disc technology;

4) likewise, to the best of our knowledge, prior to the present invention there have been no technological developments potentially capable of or specifically intended to use apodization screens to impart enhanced video characteristics of the compact disc technology.

SUMMARY OF INVENTION

Composition and use of polymers in appropriate solvent(s) with or without addition of selected dye combinations are proposed for developing a thin-layer coating on the transparent layer of optical storage media such as audio and video CDs, laser discs (LD) and DVDs for improvement of the sound and/or video quality during either recording and/or playback of the encoded digital information.

The invention can also be incorporated in manufacture of recordable (CD-R, DVD-R) and re-writeable CD (CD-RW, DVD-RW) media. In that case, the proposed composition is applied on the plastic (polycarbonate) transparent surface of optical storage media at the final stages of recordable media manufacturing.

The present invention submission relates to:

1) use of polymer-dye compositions for thin film surface coating of optical storage media for improvement of laser beam characteristics during writing and readout of the encoded information;

2) selection of the type of natural or synthetic polymers and their derivatives, possessing optical properties different and distinct from those composing optical storage media (eg, polycarbonate and acrylics) with the molecular structure, optical and surface retention properties such as to be capable of imparting to the finished optical storage media product noticeably improved accuracy of the information encoding (writing) and readout using laser beam technology as confirmed by analytical quality control evaluation systems.

3) the selection of optimal concentrations of such polymers including, but not limited to organo-silicone-derived polymeric compounds, in the complex multicomponent compositions;

4) the selection and relative concentrations of specific additives to the said composition including but not limited to natural and synthetic dyes and other organic and inorganic additives specifically selected to possess non-harmful properties with respect to the optical storage media substrate (eg., polycarbonate), and capable of enhancing the beneficial effects of selected natural or synthetic polymers and their derivatives upon the accuracy of the information encoding (writing) and readout using laser beam technology as confirmed by analytical quality control evaluation systems.

5) the method of application of the said polymer and/or polymer-dye compositions to optical storage media;

6) use of said invention in the manufacture of optical storage media and in professional audio/video industry as well as in related consumer markets.

The Novel Advantages and Practical Benefits of the Present Invention

Advantages of the present invention over other similar products claiming sound enhancement are:

1) distinct quantitative, measurable and documented consistent and reproducible enhancing effects on the technical characteristics and performance of the optical storage media in recording and playback;

2) longevity of the thin layer produced by application of the said polymer-dye mixture on the surface of the transparent layer of polycarbonate of the optical storage media;

3) ease and fastness of application of the product;

4) non-damaging nature of the product to the plastic material (s) of the optical storage media;
5) low cost of the product per application;

Additional benefits include:

a) the resulting anti-static properties of the treated optical storage media,
b) an enhanced degree of mechanical protection of the transparent optical storage media layer of the polycarbonate following the present invention polymer-dye application;
c) an enhanced resistance to contamination of the optical storage media transparent surface by spillage;
d) ease of removal of the thin layer or its modification/improvement by subsequent application of the said composition; compatibility with conventional optical storage media cleaning methods, reagent and techniques;
e) ability to restore the enhanced property by re-application of the said coating by the user and,
f) suitability to modification by alternative formulations of similar of different polymer compositions without any degree of deterioration of the original optical storage media polycarbonate transparent layer.

Polymer compositions were selected such that their absorption characteristics would be compatible with the bandwidth of the coherent laser diode emitted light generated by the optical pickup of the CD players, CD ROM drives (commonly 780–810 nm), and DVD players (shorter wavelengths).

Selection of the polymers was aimed among other objectives to produce a degree of screening of the diode light beam at the wavelengths outside the intended coherent bandwidth of 780 to 810 nm. It is known that light at lower and higher wavelengths than 780–810 nm is frequently generated by such diodes constituting the noise component of the beam. It is believed that this "undesirable" light noise may interfere with accurate performance of the data writing and reading primary beam as well as with tracking and focusing correction signals by the secondary beams (eg, I3/ITOP, I11/ITOP, I3/ITOP range).

Of particular significance is the fact that recordable optical disc media such as CD-R and CD-RW feature lower reflectivity than manufactured CD and CD-ROMs. Reduced reflectivity imposes additional requirements on the recording and/or reading laser beam expected to accurately perform either burning of pits or reading of the encoded pits in a reduced reflectivity environment. Since optical pickup action fundamentally depends on accurate cancellation of the incident and reflected beams, the reduced reflectivity requires changes in the beam characteristic such as intensity. A number of additional conflicting demands on the optical pickup assembly and the servo systems associated with it are thereby imposed by the reduced reflectivity of recordable and re-writeable optical storage media. In this context, any enhancement in beam reflectivity from recordable optical storage media not requiring an increase in the laser beam power is desirable.

The present invention effectively achieves enhancement of the reflectivity of the laser beam from the information layer as demonstrated by the analytical measurements (eg, I3/ITOP, I11/ITOP, I3/ITOP range) of the coated and uncoated identical manufactured (CDs) and recorded (CD-Rs) optical storage discs. Furthermore, given the apodizing effect of the present invention upon the laser beam, the reduced half-intensity beam spot that is used during the recording and playback from optical storage media, will reduce the effect of fluctuation in the laser beam characteristics that otherwise result in imperfect pit geometry.

Consequently, the optical storage media pre-coated with the present invention either at the manufacturing stage or by the end-user will result in more accurate encoding and subsequently reproduction of the digital data. Furthermore, the proposed composition has characteristics consistent with apodizing properties of a thin film created with the said composition. In its apodizing capacity the said composition coating will produce the desired refinement action of the laser beam characteristics. Namely, the Airy pattern maximum will be slightly reduced and the accompanying minor light frequency components will be drastically reduced.

As a result, since the optical storage media utilize optical reflectance as its fundamental operating principle of encoding and readout of information, the "refinement" of the laser beam as produced by said invention will result in a more faithful production of or readout of geometrical alterations in the information layer (pit and lands) of the optical media produced or read by the laser beam.

DETAILED DESCRIPTION OF PREFERRED EMBODIMENTS

The intention of this invention is to uniformly improve the accuracy of both the recording and readout of the encoded information through enhancement of the optical efficiency of transmission and reflection of the diode light beam. This can be achieved through the use of selected polymers and their combination with dyes in selected solvent systems compatible with the material of optical storage media (polycarbonates and acrylics, etc). The main objective of the invention was to develop a simple and inexpensive approach to modify/improve the diode laser beam characteristics in compact disc storage technology in order to achieve better resolution of the writing and readout of encoded information.

Apodization

One of the primary objectives of laser beam improvement was to minimize the contribution of "noise" frequencies accompanying the laser beam at 780 nm. The presence of these "noise" frequencies may increase the probability of error in laser beam action both during writing and readout. Since cancellation of the laser beam or its complete reflection from the data layer is used to de-code the "0's" and "1's", the presence of interfering light frequencies increases the probability of error as a result of incomplete cancellation or incomplete reflection.

Imperfections of the pit and land geometry introduced during replication of the manufactured discs or in the process of encoding information in the data layer further increase the probability of readout errors.

While the Reed-Solomon Cross-Interleave error correction system efficiently eliminates all correctable errors without noticeable audible effect, it is possible that the very involvement of the error correction system itself may help to "smooth out, average" some of the minor transient sonic details. This may occur as a result of the relatively low presence of the encoding words for such transients compared to the overall contents of the sonic encoding.

To those versed in the art, one of the approaches to reduce the contribution of "sidelobe" frequencies in a light beam is to use apodization screens. This approach effectively "purifies" the main beam frequency of the accompanying "sidelobes, or noise". As a result, the beam spot reaching the data layer becomes somewhat smaller. This, however, allows for a better resolution of the image of pits and lands of the data layer.

I chose to use the apodization approach to attempt some "refinement" of the diode laser beam in CD players and CD writers.

In order to create such apodizing screens on optical storage compact discs, I selected to use thin film coating with liquid compositions that
would not require elevated temperature curing,
would not require lengthy time exposures and
would not introduce any structural chemical or physical alteration of the manufactured product (CD, DVD, CD-R, etc);
would be able to produce noticeable improvement in the quality of the encoded and reproduced information

Choice of Coating Compounds—NLO materials

Nonlinear optical (NLO) materials are active media allowing control of light wave propagation. In the development of optical storage media and semiconductor technology, various NLO materials are constructed such that application of external stimuli such as electrical, optical, pressure and other influences produces changes in the properties of NLO materials. This can be used for either storage of information, detection of changes or other useful applications in technology (see for example: H Kuhn and J Robillard, eds. Nonlinear Optical Materials, CRC Press, 1992).

The present invention uses certain properties of NLO compositions to improve laser beam characteristics as described below. It relates only to optical properties of dye-polymer composite NLO materials which account for generation of second order harmonic signals. The extent to which second harmonic generation (SHG) of the NLO materials used in the present invention contributed to the observed improvement of laser beam performance (see Appendix section) has not been ascertained experimentally. The present invention does not extend to NLO materials with specific optical and electromagnetic properties utilized in semiconductor industry such as generation of electric potential and which form solid layers.

The selection of polymer/dye compositions was guided by the above considerations aimed at improving the properties of the laser beam entering the optically clear layer of the optical storage media to ensure improved writing and accurate readout of encoded information as reflected in the sonic and other performance characteristics (see Appendix section).

The polymers selected have an intrinsic molecular repetitive structure that imparts certain optically active characteristics to a thin layer formed by such polymers. Among optical activity of polymer thin layers are refraction, linear and circular polarization, circular dichroism, reflectance, specific light wave absorption, diffraction, etc.

The physico-chemical basis for the formation of a thin layer coating of the said polymer relates to the operation of physical forces at the air-plastic (polycarbonate) interface which result in adsorptive spreading of the polymer-dye compositions in a thin layer upon evaporation of the organic solvent(s) carrier. The repetitive molecular structure of the composing polymers is known to be retained upon adsorption onto a surface such as polycarbonate and to form a semi-permanent coating (see e.g., V Krongauz "Photochromic liquid crystal polymers" in Applied Photochromic Polymer Systems, pp 121–173, C B McArdle, ed., Chapman and Hall, N.Y. 1991)

Selection of the molecular characteristics of comprising polymers was based upon the length of the monomer constituent units in the polymers and of their derivatives as well as upon their solubility properties in organic solvent(s) and their appropriate concentrations in the said compositions.

While the detailed physico-chemical structure of the thin layers produced by such polymer-dye compositions is not available, several plausible models may be visualized.

Among these one can expect that 1) the polymer-dye thin layer due to its optical characteristics (absorbance and refractive index) is capable of "filtering, screening out" light emissions of the laser diode contaminating and interfering with the main monochromatic (780 nm) beam of the diode. This allows for a relatively "purified" beam to reach the information layer. Likewise, the polymer-dye apodizing screen apparently prevents the attenuated "noise" light reflected from information layer to pass out of the polycarbonate layer and reach the photodiode. This reduces interference with the reflected information-carrying main beam—consequently, a relatively "purified" reflected main beam can be registered by the photodiode of the optical pickup assembly;
2) the polymer-dye thin film apodizing coating may act as an optical refraction and/or diffraction lens contributing to the laser beam purity focused on the reflective data surface of the optical storage media;
3) ordered molecular structure of polymers in the thin layer coating on the polycarbonate surface of the optical storage devices (CDs/LDs/CD-Rs/CD-RWs/DVDs) contributes to circular dichroism and allows for the reduction of the reflectance of the incident beam compared to that from untreated polycarbonate surface of the transparent layer of the CDs/LDs/CD-Rs/CD-RWs/DVDs. Undesirable reflectance of the untreated surface polycarbonate layer in effect reduces the amount of light intended to reach the information layer and subsequently to be reflected from it. Consequently, undesirable polycarbonate surface reflectance may result in less than optimal readout performance of the CD player;
4) SHG in the polymer-dye coating would produce shorter light frequencies contributing to the more faithful formation of and/or readout of the pit-land geometry;
5) due to the oriented nature of molecules retained in the polymer-dye coating, a certain degree of circular dichroism can be expected to be associated with such thin film coating. The circular dichroic nature of the coating contributes to the ellipticity of the passing light beam. Since the polymer-dye coating has a different refractive index than the underlying polycarbonate layer, changes in ellipticity of the beam are likely to occur at the polymer-dye/polycarbonate interface (see e.g., R Bruce and J Robillard, New Molecular Structures for Infrared Detection and Imaging, pp 89–113 in "Nonlinear Optical Materials", H Kuhn and J Robillard, eds, CRC Press, 1992). Improvement in the laser beam performance characteristics (increased reflectance, lower cross-talk—see Appendix section) indirectly testifies to the reduction in the ellipticity of the laser beam by the polymer-dye coating;
6) finally, the apodizing effect of the polymer-dye coating reduces the side-lobe frequencies and makes the beam spot somewhat smaller also contributing to better formation of and/or readout of the pit-land geometry.

All of these phenomena would result in more efficient performance of the optical pickup and more complete and accurate readout of the information encoded on optical storage media.

It is widely recognized that the use of more sophisticated encoding (eg, 96 kHz/24 bit), sampling and readout systems is intended to reduce such distortions and imperfections resulting in a higher accuracy of audio and/or video reproduction. Most of such digital technology improvement relying on optical readout would benefit from more accurate optical conditions at the disc-air interface.

EFFECT OF INVENTION ON PERFORMANCE CHARACTERISTICS AND ANALYTICAL DATA

Support of the proposed mechanism of action of the invention is found in the analytical data measuring the accuracy of digital and analog signals from pre-coated and recorded or coated following production for purposes of playback. The analysis has been conducted on CD Associates CD evaluation system. Comparison has been made between identical CDs—an uncoated one and that coated with the product of invention.

The most significant consistent results of the present invention proved to be (see Appendix section):
1) enhancement in effective reflectivity of the beam from the invention coated CDs manifested in increased I3/ITOP, I11/ITOP ratios,
2) up to four-fold enhancement in the I3/ITOP range in the coated CDs,
3) reduction in the push-pull values (testifying to the reduction in the strain of the servo system of the optical pickup),
4) reduction in the crosstalk and jitter,
5) increase in the scanning velocity,
6) elimination of de-tracking,
7) elimination of uncorrectable errors (E32 errors)

Crosstalk represents interference of the reflected beam from neighboring pits and lands as well as from neighboring tracks. This interference significantly reduces the reliability of the accurate digital recording/encoding and readout. The effect of crosstalk increases with the increase in the density of information recording as in DVDs (in comparison with CDs).

The dramatic benefit of the coating was also represented by reduction in the time deviation parameters of the coated CDs—reduction by two orders of magnitude, bringing the time deviation from eg., 17.2 ns to 0.1 ns. The latter result testifies to the desirable elimination or reduction of the data-to-data jitter component most noticeable in the quality, accuracy of the recorded/reproduced audio/visual signal.

Coincident with that the scanning velocity of all coated discs was increased by some 5%. Furthermore, the enhancement of the performance characteristics of the coated discs was noted in complete elimination of the uncorrectable E32 errors and de-tracking.

As a result on the present invention, one perceives, for example, in audio CD playback, a substantially enhanced presence of audio detail.

Similar enhancement is noted also in CD-R recorded on CD-R and CD-RW recorders at 1×, 2× and 4× speeds (eg., Yamaha brand) and played back on conventional CD players (eg., Denon, Sony).

The audible detail enrichment effect is retained in pre-coated CD-Rs from which the present invention coating is removed after recording and prior to playback. This indicates that the present invention affords its improvement during the process of writing/encoding information onto the CD-R by conventional means.

Again the improvement during writing on CD-Rs is primarily accounted for by the notably pronounced and highly reproducible presence of the high frequency, usually low level and short duration audio signals.

When consistently added to the playback signal, the subjective perception of the improved signal is that of a "virtual presence" phenomenon, realistic space visualization, true-to-life sound coloration, the appearance of micro echoes normally heard in live performances or in nature.

METHOD OF APPLICATION

The product is composed in volatile organic solvents such as short chain aliphatic hydrocarbons, including but not limited to hexane and heptane, allowing for rapid evaporation of the carrier solvent. As a result, the polymer-dye thin film is deposited and adheres to the polycarbonate substrate of the CD. An amount equal to 0.1–0.2 mL per 12 cm in diameter CD surface is evenly distributed and proves to be sufficient to produce the said sound improvement effect.

The product can be applied either manually (eg., by a spray) or mechanically followed by an even distribution of the mixture over the entire surface of the optical storage media. Pooling, unevenness of distribution, excessive concentration and smearing of the product on the transparent polycarbonate optical storage media surface should be avoided.

Alternatively, the product can be applied automatically in a specially designed apparatus (Patent Application in preparation) that combines application and controlled, reproducible uniform distribution of the mixture over the optical storage medium surface.

The entire manual procedure requires 10–15 seconds to complete. Shorter times can be easily achieved with mechanical devices without any deterioration in the degree of sound improvement achieved by the polymer-dye mixture application.

What is claimed is:

1. An apodizing screen on the surface of an optical storage medium comprising a spreadable liquid polymer-dye film for the improvement of laser beam characteristics that possesses optical properties different and distinct from those of materials comprising optical storage media and that have the molecular structure, optical and surface retention properties such that upon application of such films on optical storage media they improve accuracy of the information encoding in (writing) and readout from optical storage media such as CDs, CD-ROMs, LDs, CD-Rs, CD-RWs, DVDs, DVD-Rs, minidiscs.

2. The apodizing screen of of claim 1 comprising mixtures of linear and/or branched derivatives of organo-silicones and dyes such as rhodamines, fluorescent derivatives, proprietary fluorescent compounds, methylene blue and optical brighteners soluble in solvents including nonpolar solvents compatible with polycarbonate and other plastics used in anufacture of optical storage media such as CDs, CD-ROMs, LDs, CD-Rs, CD-RWs, DVDs, DVD-Rs, minidiscs.

3. The apodizing screen of claim 2 where the film is applied during pre-recording of recordable formats of optical storage media such as CDs, CD-ROMs, LDs, CD-Rs, CD-RWs, DVDs, DVD-Rs, minidiscs for enhancing the correctness and degree of detail of the information recorded.

4. The apodizing screen of claim 2, where the film is applied during the playback of recorded information from optical storage media to enhance the correctness and completeness of the information readout.

5. An optical storage medium comprising a polycarbonate or other transparent plastic material, a recording layer(s) and an apodizing screen where the apodizing screen is a spreadable liquid polymer-dye film formed on the transparent surface of the optical storage medium.

6. A method of depositing the apodizing screen of claim 1 on an optical storage medium comprising deposition of a thin layers of the liquid polymer-dye film either by a wiping action or by a conventional thin layer coating process on the transparent (light transmitting) surface of the optical storage medium with a predominant radial vector of the wiping performed either manually or with a mechanical device such that the thin film is applied uniformly on the outer transparent surface of the optical storage medium.

* * * * *